United States Patent [19]

Ray

[11] 4,300,513
[45] Nov. 17, 1981

[54] CARBURETOR ATTACHMENT

[76] Inventor: Dennis A. Ray, Marin Ave., Rte. 1, Crookston, Minn. 56716

[21] Appl. No.: 79,788

[22] Filed: Sep. 28, 1979

[51] Int. Cl.³ ............................................ F02M 31/00
[52] U.S. Cl. .................................... 123/545; 261/144
[58] Field of Search ...................... 48/180 R, 180 M; 123/590, 545, 547; 261/144, 145

[56] References Cited

U.S. PATENT DOCUMENTS

| | | | |
|---|---|---|---|
| Re. 14,160 | 7/1916 | Johnson | 123/547 |
| 1,431,281 | 10/1922 | Benjamin | 123/545 |
| 1,985,271 | 12/1934 | Zucrow | 123/545 |
| 2,857,898 | 10/1958 | Cohn | 123/590 |
| 4,031,876 | 6/1977 | Hoots | 123/590 |
| 4,108,953 | 8/1978 | Rocco | 123/545 |
| 4,130,099 | 12/1978 | Ferguson | 123/590 |

Primary Examiner—Ronald H. Lazarus
Attorney, Agent, or Firm—H. Dale Palmatier

[57] ABSTRACT

A plate mounted between the carburetor and intake manifold having horizontally extending passageways and inlet and outlet ports communicating with four vertical apertures aligned with the passageways of the carburetor and intake manifold. Double-walled tubular heat exchangers, formed of spaced apart outer and inner jackets, are disposed in the vertical apertures, the spaces between the outer and inner jackets communicating with the plate passageways and being sealed from the inside of the inner jackets, such that engine coolant can be circulated through such spaces and through the plate to cause preheating of the fuel-air mixture as it passes through the inside of the exchangers and into the intake manifold. The inner periphery of each inner jacket has ring shaped serrations and a downward taper, which together with preheating by the heat exchangers results in significantly improved vaporization of the fuel-air mixture.

13 Claims, 7 Drawing Figures

CARBURETOR ATTACHMENT

BACKGROUND OF THE INVENTION

This invention relates to internal combustion engines, and, more particularly, to a carburetor attachment for improving the efficiency of such engines.

Automobile and similar internal combustion engines utilize a carburetor to bring about a mixture of fuel and air, with subsequent passage of the fuel-air mixture into an intake manifold and then to the cylinders for combustion. A long standing problem in carburetion has been to achieve optimum mixing and vaporization of the fuel and air prior to its introduction into the cylinders. If less than complete vaporization is accomplished, the combustion will be incomplete, resulting in decreased efficiency of the engine. More practically, the automobile will fail to achieve optimum gasoline mileage, and will produce increased exhaust pollution.

Numerous devices have been developed and used for improving vaporization of the fuel-air mixture, most of which devices involve the pre-heating of the fuel-air mixture prior to its passage into the intake manifold. One method of pre-heating, as disclosed in Hollabaugh, U.S. Pat. No. 3,150,652, employs circulation of the cooling fluid of the engine through a heat exchanging device disposed between the carburetor and intake manifold. In other methods, such as that disclosed in Betry, U.S. Pat. No. 2,125,216, crankcase oil is used to preheat the fuel-air mixture. Additionally, as disclosed in Ohlsson, U.S. Pat. No. 3,645,243, mesh screens and fin arrangements have been used, together with vaporizing devices, to create turbulence in the fuel-air mixture prior to entry thereof into the intake manifold. Other heat exchangers are disclosed in Wood, U.S. Pat. No. 4,029,065 and Dillow, U.S. Pat. No. 3,780,714. However, none of the known devices has provided a simple and easily installable carburetor attachment capable of producing optimum mixing and vaporization of the fuel-air mixture.

SUMMARY OF THE INVENTION

In accordance with this invention there is provided a carburetor attachment for an automobile or other internal combustion engine comprising a plate mountable between the carburetor and the intake manifold of the engine, the plate having horizontally extending passageways, to allow circulation of coolant from the engine coolant system through the plate, and vertical apertures aligned with the passageways of the carburetor and intake manifold. Double walled tubular heat exchangers, formed of spaced apart outer and inner cylindrical jackets, are disposed within the vertical apertures of the plate to define passageways communicating with the horizontal passageways of the plate, such that engine coolant can be circulated between the inner and outer jackets of each tubular heat exchanger and through the plate while the fuel-air mixture passes through the interior of each tubular heat exchanger and into the intake manifold. The inner jacket is sealed at its upper and lower portions to prevent leakage of engine coolant from the plate into the intake manifold. The inner periphery of the jacket tapers downwardly, away from the carburetor, and has ring shaped serrations, the combined action thereof resulting in accelerated flow of the fuel-air mixture through the inner cylindrical member and improved mixing and vaporization thereof.

Preferably, the plate is formed with four vertical apertures, with a tubular heat exchanger being disposed in each aperture, the heat exchangers fitting into the intake chambers of the intake manifold. Two of the four apertures are disposed adjacent the intake port of the plate, the heat exchangers thereof being substantially lesser in diameter than the heat exchangers of the remaining two apertures. The smaller exchangers are so positioned to cause preheating of the fuel-air mixture for steady running of the engine, whereas the two larger exchangers, which may be omitted, are positioned for preheating upon acceleration.

It is a primary object of this invention to provide a carburetor attachment which accomplishes more complete vaporization of the fuel-air mixture prior to its passage into the intake manifold, so as to significantly increase engine efficiency.

It is another object of this invention to provide a carburetor attachment for simultaneously speeding up the flow of the fuel-air mixture and preheating such mixture, thereby causing improved vaporization.

It is yet another object of this invention to provide a carburetor attachment for the simultaneous heating of the fuel-air mixture and for causing a nonlaminar flow of such mixture, to thereby improve vaporization.

It is a further object of this invention to provide an inexpensive and trouble free carburetor attachment for preheating a fuel-air mixture, and one that can be installed by an unskilled worker in a matter of minutes.

DESCRIPTION OF THE PREFERRED EMBODIMENTS

Figure 1:
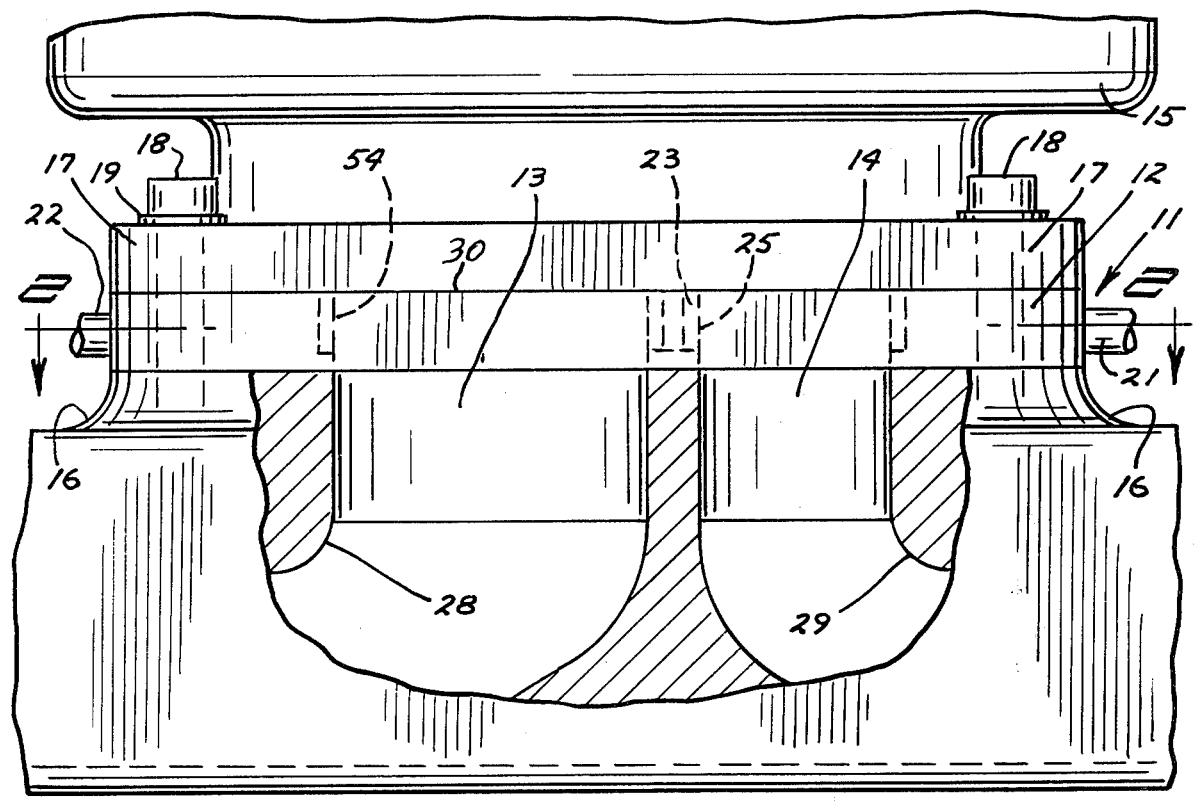
FIG. 1 is a partially broken away fragmentary view showing the carburetor attachment of this invention mounted between a carburetor and intake manifold.

Referring to FIG. 1 of the drawings, carburetor attachment 11 formed of plate 12 and tubular heat exchangers 13, 14, is mounted on an internal combustion engine between carburetor 15 and intake manifold 16 using studs, indicated by dotted lines 17, nuts 18, and washers 19. Inlet port 21 and outlet port 22 communicate with ports 23, 54 disposed adjacent vertical apertures or openings 24, 25, to define horizontal passageways running through plate 12, as will be described in more detail below. Apertures 24, 25 of plate 12 are aligned with the fuel-air mixture passageways of carburetor 15 and intake manifold 16, and tubular heat exchangers 13, 14 are inserted within passageways 28, 29 of intake manifold 16.

Asbestos gasket 30 is disposed between plate 12 and carburetor 15 to minimize heat transfer to the carburetor from plate 12 and tubular heat exchangers 13, 14.

However, asbestos gasket 30 can be omitted under certain conditions, as in winter time, when heat transfer to the carburetor itself may be desired.

Figure 2:
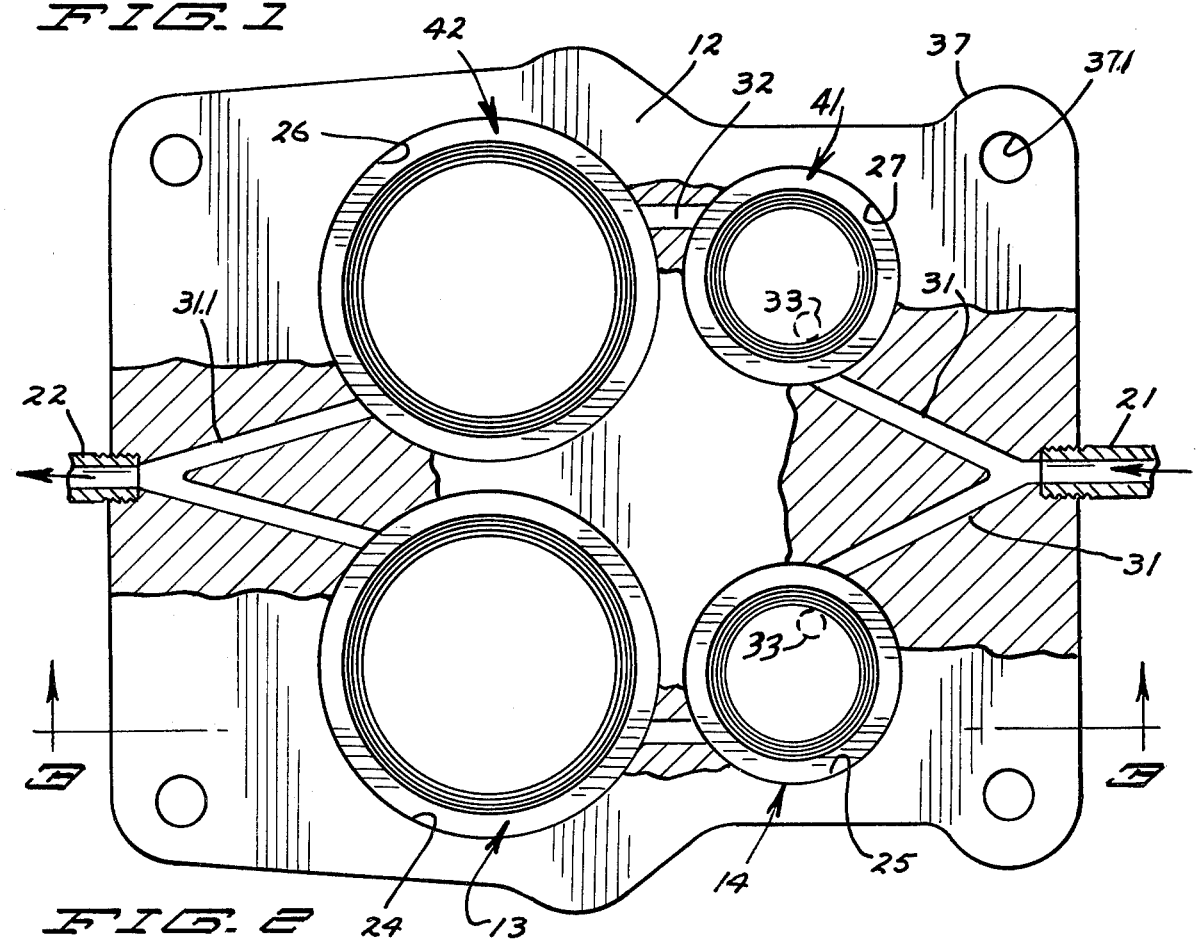
FIG. 2 is a partially broken away top plan view of the carburetor attachment shown in FIG. 1.

Referring to FIG. 2, plate 12 is shown with four vertical apertures or transverse openings 24-27, to be aligned with the passageways of carburetor 15 and the intake passageways of intake manifold 16, as shown in FIG. 1. The smaller apertures 25, 27 are disposed on the right side of plate 12 adjacent inlet port 21, which communicates with the interior of apertures 25, 27 by means of communicating passageways or ducts 31. Apertures 25, 27 in turn communicate by means of passageways or ducts 32 with larger apertures 24, 26, having exiting passageways or ducts 31.1 running to outlet port 22. Plate 12 has a contour 37 and stud holes 37.1 such that it can be firmly secured to intake manifold 16 beneath carburetor 15 without any projecting edges.

The size of the tubular heat exchangers, the nature and function of which will be explained below, depends only upon the type of intake manifold used in the engine. Preferably, the smaller exchangers 14, 41 are positioned adjacent the intake port 21 such that they will first receive the hot water from the engine coolant system during the preheating operation. The idle fuel jet in carburetor 15 should be located directly above the hottest portion of exchanger 41, the "hot spot" being indicated by circles 33, adjacent the ducts 31 which supply the hottest engine coolant to the heat exchangers. The smaller exchangers 14, 41 are so positioned to provide preheating for steady running of the engine, whereas the larger exchangers 13, 42 are positioned to provide preheating for acceleration purposes. The length of the heat exchangers is dictated primarily by the type of intake manifold used; however, the exchangers should be as long as possible without disturbing the carburetor linkage and other engine systems.

Figure 3:
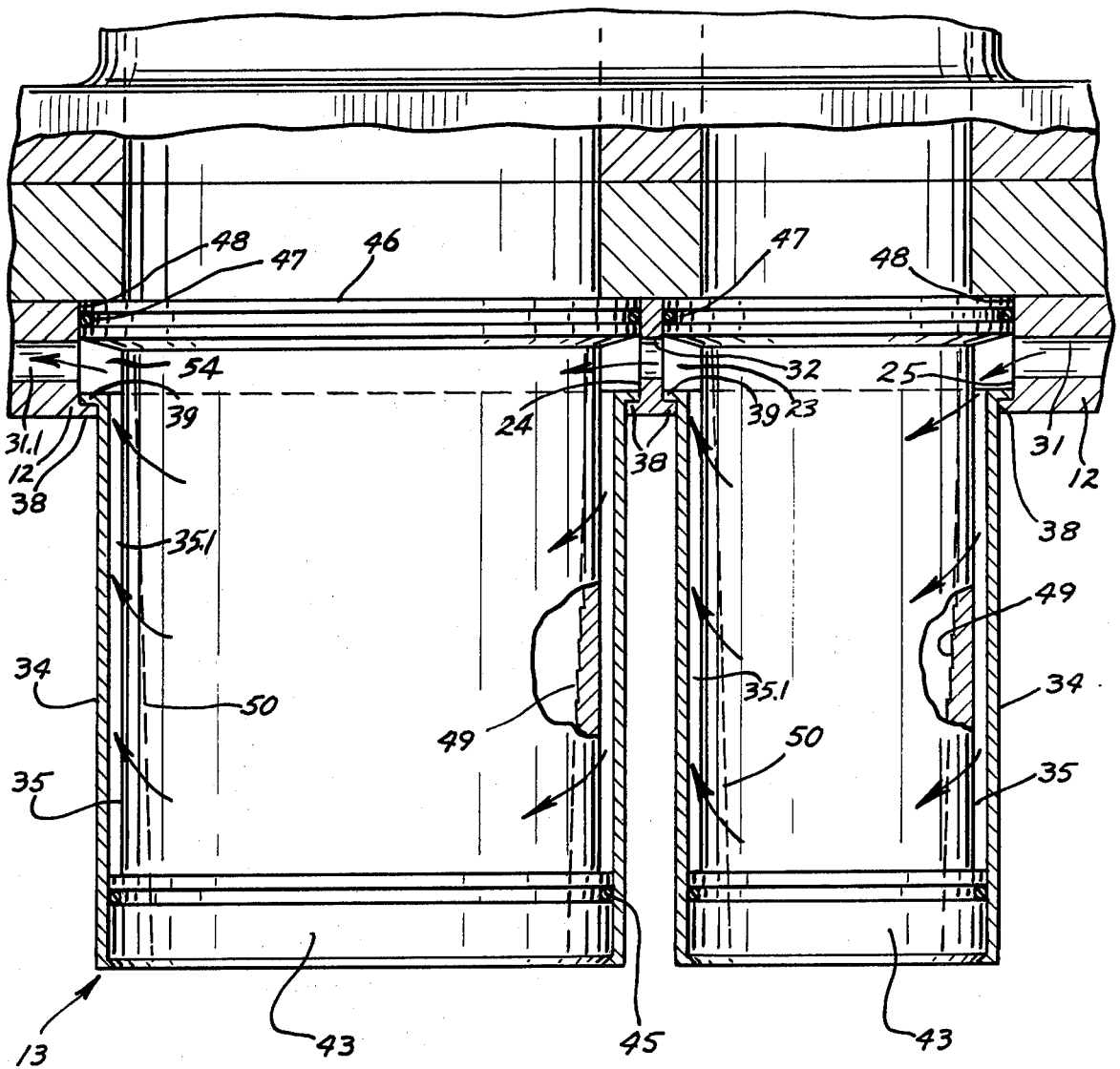
FIG. 3 is a partially broken away cross-sectional view taken along line 3—3 of FIG. 2.

Referring to FIG. 3, plate 12 is shown in cross-section with tubular heat exchangers 13, 14, having outer and inner heat transfer tubes or jackets 34, 35, in operating position within vertical apertures 24, 25. A bottom portion of the apertures 24, 25 is provided with shoulders 38, and the upper ends of the outer jackets 34 are provided with flanges 39, such that the outer jackets can be inserted into apertures 24, 25 from above and pushed down into a secure seating relationship on shoulders 38. It is important that the shoulders 38 be located below passageway 31 of plate 12, so as not to block such passageways. Inner jackets 35 are disposed in spaced apart relationship within outer jackets 34, the inner jackets 35 having extended, grooved lower portions 43 with rubber O-rings 45 set in the grooves for effecting a seal against the inner surface of outer jackets 34. The upper portions of jackets 35 are provided with grooved flanges 46 and O-rings 47 set in the grooves for effecting a seal of the upper portion of inner jackets 35 with surfaces 48 of apertures 24, 25. Flange 46 of inner jackets 35 is disposed above the passageways or ducts 31 31.1 and 32; in plate 12 so as not to obstruct flow of engine coolant through passageways 31 and annular heating fluid chambers 35.1; between the outer of the inner jackets 35 and inner surfaces of outer jackets 34, in the direction of the arrows.

The inner periphery of jackets 35 of each tubular heat exchanger tapers downwardly, as indicated by slanted dotted lines 50. Also, the inner periphery has a plurality of ring shaped sharp edged serrations 49, which become progressively smaller in diameter in a downward direction due to the downward taper.

In operation, heated coolant from the radiator flows by means of a water pump (not shown) through conduits to intake port 21, as shown in FIG. 2, and thence through passageways 31 and port 23 into the double-walled spaces or chambers 35.1 between the inner and outer jackets 34, 35 of each heat exchanger 14, 41. Water at a temperature of about 200 degrees Farenheit, for example, will be circulated over the entire outer surface of inner jacket 35, to uniformly heat such inner jacket to a temperature of about 200 degrees Farenheit, before such heated water is passed through connecting passageway 32 and into the double-walled spaces of the left most exchangers. After circulating as in the right most exchangers 13, 42, the heated water passes out of port 54 and through passageway 35 to outlet port 22. While heated engine coolant is passing through the passageways of the plate and between the heat exchanger jackets, the fuel-air mixture is passed from carburetor 12 through the inside of each heat exchanger and into the passageways of the intake manifold. The tapering inner periphery of each inner jacket causes accelerated flow of the fuel-air mixture, while the ring shaped serrations create turbulence of the fuel-air mixture, both of which features have been found to cause, together with the preheating accomplished by the circulation of heated engine coolant as described, greatly improved vaporization of the fuel-air mixture prior to its introduction into the intake manifold.

In dynamometer tests conducted on automobile engines with and without the carburetor attachment of this invention it was found that at a setting of 100 foot pounds of torque at 2000 rpm's, the engine using a standard carburetor ran for 4.5 minutes on five cups of gasoline. An engine using the carburetor attachment of this invention, using the same five cups of gasoline, was found to run 5 minutes. The engine with the standard carburetor produced twice as much hydrocarbon pollution in its exhaust as did the engine using the carburetor attachment of this invention. Also, with the same loading, the carbon monoxide produced without the carburetor attachment was 0.5, whereas with the carburetor attachment it was only 0.2.

In highway tests, a four-wheel drive 1977 Chevrolet, with a 350 cubic inch engine, exhibited gasoline mileage of 18 miles per gallon with the carburetor attachment of this invention, whereas it produced only 15 miles per gallon without such attachment. Similarly, a 1979 GMC four-wheel drive vehicle, with a 350 cubic inch engine, had 13.9 miles per gallon before, and 18.6 miles per gallon after installation of the carburetor attachment; and a 1972 Lincoln Mark IV, with a 460 cubic inch engine, had its mileage increased from 15 miles per gallon to 17.9 miles per gallon using the carburetor attachment. Generally, the carburetor attachment accomplishes a 3.5 to 4.0 increase in the miles per gallon of standard automobile engines, and greatly extends the range of the typical automobile.

Figure 4:
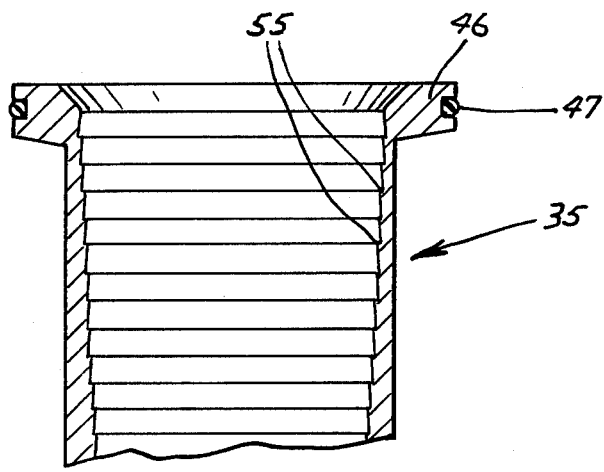
FIG. 4 is a fragmentary cross-sectional view of one of the inner jackets used in the carburetor attachment of this invention.

Referring to FIG. 4, inner jacket 52 has a downwardly tapering inner periphery 55 with an inner surface formed with a horizontal pattern of ring like serrations and notches which define sharp cornered undulations with upwardly facing ledges adjacent the sharp corners. Where longer heat exchangers are used, the degree of taper is preferably about 1 degree, whereas for the exchangers shown in FIG. 1 the degree of taper is preferably about 3 degrees. The diameter at the bottom of each inner jacket is the same no matter what the length of the exchanger.

Figure 5:
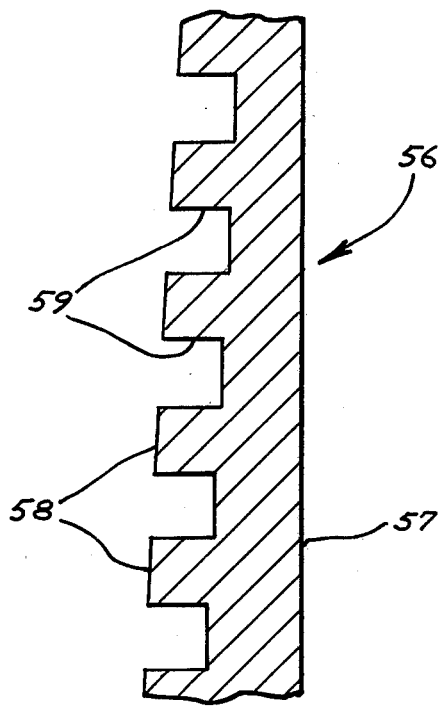
FIG. 5 is a fragmentary cross-sectional view showing the ring shaped serrations of a modified inner jacket used in the carburetor attachment of this invention.
Figure 6:
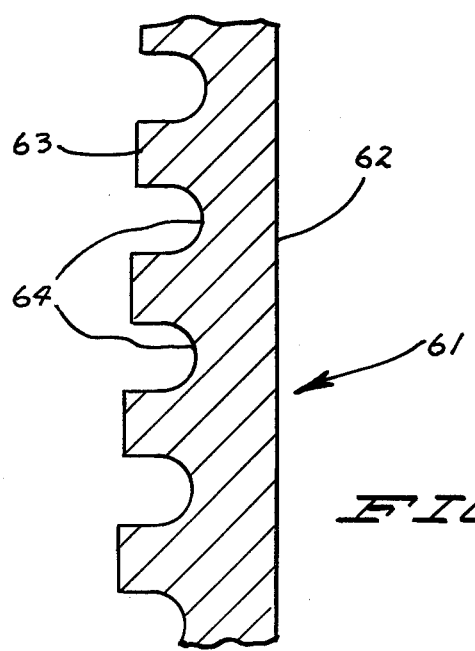
FIG. 6 is a view similar to FIG. 5 showing another form of serrations for an inner jacket.

In FIG. 5, inner jacket 56 has outer surface 57, tapering inner surface 58, and rectangular serrations or grooves 59 set horizontally across the inside of the periphery from top to bottom thereof. Sharp cornered ribs separate adjacent grooves. In FIG. 6, inner jacket 61 has outer surface 62, tapering inner surface 63 and concave serrations 64 running continuously from top to bottom thereof. In all of the inner jackets of FIGS. 4, 5 and 6, the downwardly flowing fuel-air mixture encounters sharp edged corners along the inner surface of the jackets.

Figure 7:
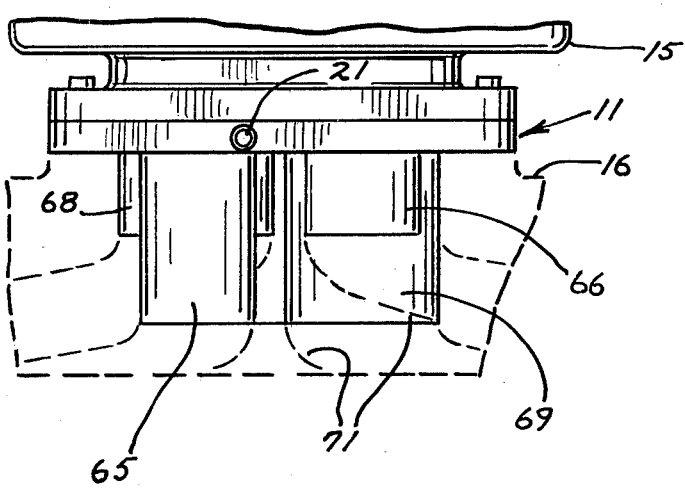
FIG. 7 is a modified form of the carburetor attachment of this invention.

Referring to FIG. 7, carburetor attachment 11 is shown in modified design, with tubular heat exchangers of different sizes. Exchangers 65, 66 are of a smaller diameter than the rear exchangers 68, 69. Also, exchangers 65, 69 are substantially longer than exchangers 66, 68. As noted above, the length of all four exchangers is dependent primarily on the construction of the intake manifold in which the exchangers will be fitted, but all exchangers should be as long as possible to insure maximum preheating of the fuel-air mixture. The intake chambers of intake manifold 16 are indicated by dotted lines 71.

Alternately, in another modification, the rearmost tubular heat exchangers, such as exchangers 68, 69 of FIG. 7, may be omitted from the carburetor attachment, where preheating is desired only for steady running of the engine. In such case the rearmost apertures, i.e. those furthest from inlet 21, are fitted with exchangers which are of the same thickness as plate 12, to allow circulation of coolant through plate 12 while performing only minimal preheating of the fuel-air mixture.

The carburetor attachment of this invention, utilizing the tubular heat exchangers as described above, together with downward tapering and serrated inner peripheries of the inner jackets, has been found to provide greatly improved vaporization of the fuel-air mixture as it passes from the carburetor into the intake manifold. Continuous and uniform preheating, up to temperatures of about 200 degrees Farenheit, is accomplished over the entire surface area of the inner jackets of each exchanger, while at the same time the tapering and serrated characteristics thereof create turbulence in the fuel-air mixture during its passage, such that maximum vaporization is achieved. As a result, automobiles using the carburetor attachment of this invention can operate more efficiently, at greater distances, and with significantly less exhaust pollution. Also, the carburetor attachment is formed of a minimum of parts, all of which can be inexpensively manufactured and assembled, the attachment itself being installable by unskilled mechanics or the automobile user himself in a matter of minutes.

It is claimed:

1. An attachment for connection with the cooling system of an internal combustion engine and for insertion between the carburetor and the intake manifold of the engine, comprising heat transfer means including upright heat transfer tubes to be positioned between and in open communication with the air-fuel mixture conveying passages of the carburetor and intake manifold to pass the air-fuel mixture therethrough, heat supplying means mounting and confining the outer peripheries of the heat transfer tubes and cooperating with the tubes in defining closed end annular heating fluid chambers around the tubes, the heat supplying means including a rigid plate to lie between the carburetor and intake manifold, the plate having transverse openings through which the heat transfer tubes extend, the peripheries of the transverse openings defining portions of said annular chambers, the tubes and heat supplying means maintaining the interiors of the tubes and said annular chambers in fluid flow isolation relative to each other, the plate having duct means therethrough in open flow communication with the transverse openings to direct hot engine coolant to and through the annular heating fluid chambers, the duct means having inlet and outlet ends for flow connections with the cooling system of the engine, and the inner peripheries of the tubes being tapered convergently in a downward direction and having a multiplicity of substantially annular sharp cornered surface undulations defining upwardly facing ledges adjacent the sharp corners.

2. The attachment according to claim 1 and the tubes extending downwardly beyond the closed lower ends of the annular heating fluid chambers.

3. The attachment according to claim 1 and the tubes having upper ends defining out turned flanges sealed against the plate at the peripheries of the transverse openings and defining the closed upper ends of the annular heating fluid chambers.

4. The attachment according to claim 3 and the duct means opening into the annular chambers at locations adjacent the out turned flanges.

5. The attachment according to claim 1 and the plate having pairs of transverse openings of various smaller and larger sizes corresponding to the air-fuel mixture conveying passages of the carburetor, and the inlet end of the duct means having direct flow communication with the smaller sized transverse openings for supplying the hottest engine coolant to the annular heating fluid chambers adjacent the smaller openings.

6. An attachment for connection with the cooling system of an internal combustion engine and for insertion between the carburetor and the intake manifold of the engine, comprising heat transfer means including upright heat transfer tubes to be positioned between and in open communication with the air-fuel mixture conveying passages of the carburetor and intake manifold to pass the air-fuel mixture therethrough, heat supplying means mounting and confining the outer peripheries of the heat transfer tubes and cooperating with the tubes in defining closed end annular heating fluid chambers around the tubes, the heat supplying means including a rigid plate to lie between the carburetor and intake manifold, the plate having transverse openings through which the heat transfer tubes extend, the peripheries of the transverse openings defining portions of said annular chambers, the tubes and heat supplying means maintaining the interiors of the tubes and said annular chambers in fluid flow isolation relative to each other, the plate having duct means therethrough in open flow communication with the transverse openings to direct hot engine coolant to and through the annular heating fluid chambers, the duct means having inlet and outlet ends for flow connections with the cooling system of the engine, and the inner peripheries of the tubes being tapered convergently in a downward direction and having a multiplicity of substantially annular surface undulations defining inwardly protruding sharp cornered ribs.

7. The attachment according to claim 6 and the tubes having lower ends protruding downwardly from the plate to extend into the intake manifold.

8. An attachment for connection with the cooling system of an internal combustion engine and for insertion between the carburetor and the intake manifold of the engine, comprising heat transfer means including upright heat transfer tubes to be positioned between and in open communication with the air-fuel mixture conveying passages of the carburetor and intake manifold to pass the air-fuel mixture therethrough, heat supplying means mounting and confining the outer peripheries of the heat transfer tubes and cooperating with the tubes in defining closed end annular heating fluid chambers around the tubes, the heat supplying means including a rigid plate to lie between the carburetor and intake manifold, the plate having transverse openings through which the heat transfer tubes extend, the peripheries of the transverse openings defining portions of said annular chambers, the tubes and heat supplying means maintaining the interiors of the tubes and said annular chambers in fluid flow isolation relative to each other, the plate having duct means therethrough in open flow communication with the transverse openings to direct hot engine coolant to and through the annular chambers for heating the tubes, the duct means having inlet and outlet ends for flow connections with the cooling system of the engine, and the inner peripheries of the tubes being tapered convergently in a downward direction.

9. The attachment of claim 8 wherein the downward taper of the inner peripheries of the heat transfer tubes is from about 1 to 3 degrees.

10. The attachment of claim 8 wherein the inner peripheries of the heat transfer tubes have steplike patterns of annular notches running from top to bottom and becoming progressively smaller in diameter due to the downward taper.

11. The attachment of claim 10 wherein said annular notches are in the form of annular grooves opening inwardly of the heat transfer tubes, the bottoms of the annular grooves having concave inner surfaces.

12. The attachment of claim 8 additionally comprising an asbestos gasket disposed between the upper surface of the plate and the lower surface of the carburetor.

13. The attachment according to claim 10 and the heat supplying means also including tubular jackets surrounding the heat transfer tubes and having lower ends sealed to the tubes and upper ends sealed to the plate opening peripheries.

* * * * *

UNITED STATES PATENT AND TRADEMARK OFFICE
CERTIFICATE OF CORRECTION

PATENT NO. : 4,300,513
DATED : November 17, 1981
INVENTOR(S) : Dennis A. Ray

It is certified that error appears in the above-identified patent and that said Letters Patent are hereby corrected as shown below:

Column 4, line 13, after "exchangers" and before the period, insert --13, 42--.

Column 4, line 14, delete "13, 42".

Signed and Sealed this

Ninth Day of March 1982

[SEAL]

Attest:

GERALD J. MOSSINGHOFF

Attesting Officer           Commissioner of Patents and Trademarks